(12) United States Patent
Bartels et al.

(10) Patent No.: US 10,230,655 B2
(45) Date of Patent: Mar. 12, 2019

(54) METHOD FOR TRANSMITTING PRIORITIZED DATA AND A TRANSMITTER

(71) Applicant: Airbus Operations GmbH, Hamburg (DE)

(72) Inventors: Uwe Bartels, Hamburg (DE); Marcus Venzke, Hamburg (DE); Maurice Girod, Hamburg (DE); Maciej Mühleisen, Hamburg (DE); Christoph Petersen, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 15/347,975

(22) Filed: Nov. 10, 2016

(65) Prior Publication Data
US 2017/0142022 A1    May 18, 2017

(30) Foreign Application Priority Data
Nov. 13, 2015  (EP) .................................... 15194556

(51) Int. Cl.
| | | |
|---|---|---|
| *H04L 12/863* | (2013.01) | |
| *H04L 12/861* | (2013.01) | |
| *H04L 29/06* | (2006.01) | |
| *H04L 12/865* | (2013.01) | |
| *H04B 7/185* | (2006.01) | |
| *H04L 12/851* | (2013.01) | |
| *H04L 12/841* | (2013.01) | |

(52) U.S. Cl.
CPC .......... *H04L 47/6245* (2013.01); *H04L 47/24* (2013.01); *H04L 47/28* (2013.01); *H04L 47/6275* (2013.01); *H04L 47/6295* (2013.01); *H04L 49/9084* (2013.01); *H04L 69/04* (2013.01); *H04B 7/18506* (2013.01)

(58) Field of Classification Search
None
See application file for complete search history.

(56) References Cited

U.S. PATENT DOCUMENTS

| | | | |
|---|---|---|---|
| 2004/0027255 A1 | 2/2004 | Greenbaum | |
| 2007/0297416 A1 | 12/2007 | Boley et al. | |
| 2012/0033612 A1* | 2/2012 | Jazra ...................... | H04L 47/14 370/328 |

OTHER PUBLICATIONS

EP 15194556.5 Extended Search Report dated May 19, 2016.
(Continued)

*Primary Examiner* — Diane L Lo
(74) *Attorney, Agent, or Firm* — Lerner, David, Littenberg, Krumholz & Mentlik, LLP

(57) ABSTRACT

Described is a method for transmitting continuously created data items from an aircraft to a receiver. The data items are of a plurality of data types and each have a different priority. For each data type a live LIFO buffer and a main LIFO buffer are provided. In a regular operation mode continuously created data items are continuously stored in the main buffers. In a transmission operation mode continuously created data items are continuously stored in the live buffers, consecutive data packets are transmitted and for each data packet the data is selected from the buffers, wherein data items stored in live buffers are transmitted before data items stored in main buffers and data items of higher priorities are transmitted before data items of lower priorities. Further, a transmitter and an aircraft are described and claimed.

17 Claims, 3 Drawing Sheets

(56) References Cited

OTHER PUBLICATIONS

Paul Sweeney: "Why Change from PCM? Case Study of Airbus A380 Ethernet based Data Acquisition Network", International Telemetering Conference (ITC), Oct. 31, 2005 (Oct. 31, 2005), XP055271522, Retrieved from the Internet: URL:http://arizona.openrepository.com/arizona/bitstream/ <http://arizona.openrepository.com/arizona/bitstream/> 10150/604805/1/ITC_2005_05-05-02.pdf [retrieved on May 10, 2016].

Rcc et al: "IRIG 106 2015 Chapter 7 Packet Telemetry Downlink", Jul. 31, 2015 (Jul. 31, 2015), pp. 1-14, XP055271390, Retrieved from the Internet: URL:http://www.irig106.orgjdocs/106-15/cha <http://www.irig106.orgjdocs/106-15/chapter7.pdf [retrieved on May 10, 2016].

Rcc et al: "IRIG 106 Chapter 10 Digital Recording Standard", Jul. 31, 2015 (Jul. 31, 2015), pp. 1-198, XP055271383, Retrieved from the Internet: URL:http://www.irig106.orgjdocs/106-15/cha <http://www.irig106.orgjdocs/106-15/chapter10.pdf [retrieved on May 10, 2016].

\* cited by examiner

METHOD FOR TRANSMITTING PRIORITIZED DATA AND A TRANSMITTER

FIELD OF THE INVENTION

The present invention relates to a method for transmitting continuously created data items from an aircraft to a receiver, a transmitter for transmitting continuously created data items from an aircraft to a receiver and an aircraft comprising such a transmitter.

BACKGROUND OF THE INVENTION

Today flight accident investigations largely rely on the data recorded in the so-called flight recorder. Flight recorders used onboard commercial aircraft are usually fixed to the aircraft. Thus, if access to the aircraft itself is difficult, for example, because the aircraft accident occurred over open water and the wreckage sunk after the accident, it may be difficult to retrieve the flight recorder. To overcome this disadvantage, it has been suggested to transmit at least part of the data stored in the flight recorder from an aircraft to a receiver, e.g., a ground station before the accident happens such that at least some information is readily available well before the flight recorder has been successfully retrieved.

BRIEF SUMMARY OF THE INVENTION

In the prior art it has been suggested to continuously transmit the data stored in the flight recorder from the aircraft to a ground station. Due to the high cost of satellite data transmission and the limited bandwidth available, this approach is not feasible in practice, in particular, as most of the transmitted data is not required and would be discarded immediately. It has, therefore, previously been suggested to transmit flight recorder data only after it has been detected that an accident is likely to occur. While this approach prevents extensive costs due to unnecessary data transmission, the bandwidth and the transmission time available will usually be limited. Thus, a choice has to be made which kind of the flight recorder data is transmitted from the aircraft to a ground station.

It is, therefore, an aspect of the present invention to provide a method and a transmitter for selectively transmitting flight recorder data from an aircraft to a receiver before an aircraft accident takes place that takes into consideration that various types of data may be transmitted and that the transmission time and bandwidth are limited.

In a first aspect the problem is solved by a method for transmitting continuously created data items from an aircraft to a receiver. The data items are of a plurality of data types and each of the plurality of data types is assigned a different priority ranging from a highest priority to a lowest priority. Last-in-first-out buffers are provided for storage of the continuously created data items. For each data type a separate live buffer and a separate main buffer are provided and associated with the respective data type. Data items of a specific data type are only stored in the associated buffers. In a regular operation mode continuously created data items of the plurality of data types are continuously stored in the associated main buffers. In a transmission operation mode continuously created data items of the plurality of data types are continuously stored in the associated live buffers, consecutive data packets are transmitted from the aircraft to a receiver via a data transmission link, each data packet comprising a header section and a payload section, and for each data packet the data to be transmitted in the payload section is selected from the buffers, wherein any data item stored in a live buffer is transmitted before any data item stored in a main buffer, wherein of those data items stored in one of the live buffers, any data item of a data type having a higher priority is transmitted before any data item of a data type having a lower priority, and wherein of those data items stored in one of the main buffers, any data item of a data type having a higher priority is transmitted before any data item of a data type having a lower priority.

In other words, the method according to an aspect of the present invention transmits continuously created data items of different data types with different priorities. Within the present application, the term "continuously" does not necessarily refer to data items that are created non-intermittently, i.e., there may even be longer gaps in time between the two consecutive continuously created data items. The term "continuously" describes that the data items are created over the entire time of a flight whenever scheduled or whenever an event occurs that is reflected in a data item. Continuously created data items have to be seen in contrast to data items of fixed content, such as, for example, an identifier of an aircraft.

A data item may be any kind of grouped information that is intended for storage in a flight recorder or for transmission with the method according to an aspect of the present invention. Thus, a data item in its broadest form is a set of bits of different length and different content. The length of the bit stream and the content depends on the data type. Examples of data types are flight data, air traffic control messages, cockpit voice recordings and cockpit images. Flight data may comprise, for example, recordings of a course of an aircraft, an altitude of the aircraft, a roll rate, a yaw rate and control inputs of pilots. Air traffic control messages are data messages received by an aircraft and may, for example, include flight plans, meteorological data or notice to airmen. Cockpit voice recordings may, for example, include any oral communication of pilots via radio or any word spoken in the cockpit of the aircraft. Finally, cockpit images can, for example, be images captured by a camera mounted in the cockpit of an aircraft. In an exemplary, preferred embodiment the method is adapted to transmit data items of the following data types: flight data, air traffic control messages and cockpit voice recordings.

Each data type has an assigned priority selected from a range of priorities ranging from a highest priority to a lowest priority. For example, if data items of the data types flight data, air traffic control messages and cockpit voice recordings shall be transmitted, air traffic control messages data items could be assigned the highest priority, cockpit voice recordings data items could be assigned the lowest priority and flight data data items could be assigned an intermediate priority.

The method according to an aspect the present invention uses buffers for temporary storage of data items. The buffers are all last-in-first-out (LIFO) buffers or stacks. Thus, data items are arranged in the buffers in the order in which they were stored in the buffer, i.e., pushed onto the stack. In other words, the data items are stored in the buffer in a temporal order and it is only possible to retrieve the data items stored in the buffer in a temporal order. Thus, if a data item shall be retrieved from the buffer, the data item stored last is retrieved, than the data item stored second to last and so on. In other words, whenever a data item shall be retrieved from the stack, the data item stored last is pushed first from the stack and reveals the data item stored second to last and so on.

For each of the data types that shall be transmitted at least two separate associated buffers are provided: a live buffer and a main buffer. For example, if data items of the data types flight data, air traffic control messages and cockpit voice recordings shall be transmitted with the method, a live buffer and a main buffer are provided for flight data, a live buffer and a main buffer are provided for air traffic control messages and a live buffer and a main buffer are provided for cockpit voice recordings. Data items of a specific data type can only be stored in the associated buffer, e.g., data items of the data type flight data can only be stored in a flight data main buffer or a flight data live buffer. As each live buffer and each main buffer is associated with a data type, each data type is also associated with one main buffer and one live buffer.

The method can operate in two different operation modes: a regular or normal operation mode and a transmission operation mode. In the regular operation mode the data items that may be transmitted according to the method are continuously stored in the associated main buffers. In other words, whenever a new data item of a data type that shall be transmitted in the transmission operation mode is created, the data item is stored in the main buffer associated with the data type of the data item, i.e., pushed on top of the stack of the main buffer of the respective data type. No data is transmitted in the regular operation mode.

When the method switches from the regular operation mode to a transmission operation mode, continuously created data items are not stored in the main buffers associated with the respective data types anymore, but stored in the live buffers associated with the respective data types. In other words, once the method has switched to a transmission operation mode, it stores any created data items in the live buffer associated with the data type of the created data items, i.e., an air traffic control message data item received by the method when it operates in the transmission operation mode is stored in the air traffic control messages live buffer.

Further, in the transmission operation mode consecutive data packets are transmitted from the aircraft to a receiver via a data transmission link. For example, data packets in form of internet protocol (IP) data packets are transmitted via a transmission link in form of a satellite communication data connection to a receiver in form of a ground station. The data packets comprise a header section and a payload section. The header section may comprise, for example, an IP header, a user datagram protocol (UDP) header and an aircraft identifier. In the payload section of the data packet, selected data from the data items stored in the buffers is transmitted.

This data is selected according to the following rules. Any data item stored in a live buffer is transmitted before a data item stored in a main buffer. Any data item stored in a live buffer of a data type having a higher priority is transmitted before a data item stored in a live buffer having a relatively lower priority. Finally, any data item stored in one of the main buffers of a data type having a higher priority is transmitted before a data item having a relatively lower priority. For example, if data items of the data types flight data, air traffic control message and cockpit voice recordings shall be transmitted and flight data has the highest priority assigned, air traffic control messages an intermediate priority and cockpit voice recordings the lowest priority, any air traffic control message item stored in live buffer is transmitted before any other data item. Next, if no more air traffic control message data items are stored in the associated live buffer, any flight data data item stored in a live buffer is transmitted followed by any cockpit voice recording data item. Finally, data items stored in the main buffers are transmitted in the same order. It should be noted that a data item that is transmitted will be removed from the respective buffer such that the buffer comprises one data item less than before.

While data packets are transmitted, new data items may be created. Such newly created data items are stored in the live buffers associated with the respective data types. Every time the method selects data items for the payload section of the next data packet to be transmitted, it first selects data items from the live buffers in the order of the priority of the respective associated data types before selecting data items from main buffers in the order of the priority of the respective associated data types.

In the above example, when a new flight data data item is created while the method operates in transmission operation mode, this data item is pushed on top of the stack forming the flight data live buffer. Now when the method selects data items for the next data packet, the data item stored last in the live buffer is selected first. In other words, the latest data item of the data type having the highest priority is always transmitted first. Afterwards, all other data items of the data type having the highest priority and received by the method after the method has switched into transmission operation mode are transmitted. Next, all data items of the next lower priority received after the method has switched to transmission operation mode are transmitted in the opposite temporal order in which they were created. The further data items then follow in the same manner. Data items stored in the main buffer, i.e., data items received by the method before the method has switched to the transmission operation mode are only transmitted if all data items received after the method has switched to transmission operation mode have been transmitted.

Thus, the use of LIFO buffers and the selection of data items in the order from live buffers to main buffers and in the order of the priority of the data type associated with the buffers advantageously ensures that the latest data items created or received by the method once the transmission operation mode has been activated which have been given the highest priority are transmitted before any other data item having a lower priority or received before the transmission operation mode has been activated. The method, therefore, advantageously ensures that the limited bandwidth is used to its maximum extent to make sure that the most relevant data items are transmitted first even if the bandwidth is very low. If a high bandwidth is available when the method switches into transmission operation mode, the main buffer advantageously provides at least a limited amount of previously recorded data items that can be readily transmitted to the ground station. However, the method advantageously ensures that any newly created data item is transmitted first.

In a preferred embodiment for each of the live buffers a maximum age for data items to be retained in the live buffer is defined, wherein in the transmission operation mode a data item is moved from a live buffer to a respective main buffer when an age of the data item exceeds the maximum age defined for the live buffer, wherein any data item that has been stored in a live buffer before an other data item is moved to the main buffer before the other data item.

In other words, for each of the live buffers it is defined how long data items will be stored or kept in the live buffer by defining a maximum age of data items that are retained in the buffer. For example, data items of the flight data data type may be retained for one minute in the respective live buffer. Data items of the air traffic control message data type may be retained for five minutes in the respective live buffer. If an age of a data item stored in a live buffer exceeds the respective maximum age, i.e., if the data item was created or stored in the buffer longer ago than the maximum age, the data item is moved to the respective main buffer. By defining a maximum age for a data item stored in a live buffer it is ensured that only data items created at a relevant point in time are transmitted. The age of a data item can be defined from the point in time when the data item was created or from the point in time when the data item was stored in a buffer.

If data items are continuously created at predetermined time intervals, i.e., with a fixed frequency, and have a predetermined size, defining a maximum age corresponds to defining a maximum storage capacity for a predetermined number of data items. Cockpit voice recordings may, for example, be continuously created at predetermined intervals and stored in the form of frames or data items representing 20 ms of recorded sound. A maximum age of cockpit voice recording data items stored in the live buffer could, for example, be set to 1 minute. Thus, the live buffer has a maximum storage capacity of 3000 cockpit voice recording data items. This is equivalent to stating that the live buffer stores only data items not older than 1 minute. Thus, in the transmission operation mode data items are moved from a live buffer to a respective main buffer when the maximum amount of data items that can be stored in the live buffer has been reached, wherein any data item that has been stored in a live buffer before an other data item is moved to the main buffer before the other data item. The maximum storage capacity of the buffer may, for example, be limited by the physical storage capacity of the memory used for actually storing the data items.

In other words, in this case the buffers have a limited capacity. If the maximum number of data items that can be stored in a buffer has been reached, the buffer overflows and removes the oldest data item from the buffer to make space for a new data item. The oldest data item is the data item stored first in a temporal order in the buffer. However, data items from the live buffer are not simply discarded. In the preferred embodiment they are instead moved to the main buffer, i.e., pushed onto the top of the main buffer. Thus, if the bandwidth of the transmission link is temporarily too low to transmit all data items created once the transmission operation mode has been activated, additional temporary storage space for data items is provided in the main buffers. If the bandwidth increases while the method is in the transmission operation mode, those data items moved or pushed to the main buffer which are still stored in the main buffer are available for transmission.

In a preferred embodiment for each data type a separate overflow buffer is provided and associated with the respective data type and for each of the main buffers a maximum age for data items to be retained in the main buffer is defined. A data item is moved from a main buffer to a respective overflow buffer when an age of the data item exceeds a maximum age defined for the main buffer, wherein any data item that has been stored in a main buffer before an other data item is moved to the overflow buffer before the other data item. In the transmission operation mode any data item stored in a main buffer is transmitted before any data item stored in an overflow buffer. Of those data items stored in one of the overflow buffers any data item of a data type having a higher priority is transmitted before any data item of a data type having a lower priority. In other words, an additional overflow buffer provides additional storage space for any data items overflowing from the main buffers.

It should be pointed out that in certain embodiments no maximum age is defined for the live buffers but a maximum age is defined for each of the main buffers. In other words, any data item stored in a live buffer is maintained in the live buffer and only data items stored in the main buffers are moved to the respective overflow buffers if the age of the data items stored in the main buffers exceeds a predetermined maximum age. Thus, in this embodiment in the transmission operation mode any data item of a higher relevance created after the transmission operation mode has been triggered is transmitted before a data item of a lower relevance created after the transmission operation mode has been triggered.

In an exemplary preferred embodiment the method is adapted for transmitting also data items of an additional data type. The additional data type has a different priority than any of the other data types selected from a range of priorities ranging from a lowest to a highest priority. For the additional data type a separate overflow buffer is provided and associated with the additional data type. Data items of the additional data type are stored in the associated overflow buffer in the transmission operation mode and in the regular operation mode. Data items of the additional data type are treated like data items of any of the other data types, i.e., of those data items stored in one of the overflow buffers including the overflow buffer for an additional data type any data item of a data type having a higher priority is transmitted before any data item of a data type having a lower priority. An additional data type may, for example, be cockpit images. An overflow buffer for data items of an additional data type advantageously provides a means of transmitting data items of a lower priority than other data items if a high bandwidth should be available. If the method is adapted for also transmitting data items of an additional data type, the data types for which a live buffer, a main buffer and an overflow buffer are provided could also be referred to as first data types and the additional data type for which only an overflow buffer is provided could also be referred to as second data type. Consequently, data items of a first data type could be referred to as first data items and data items of a second or additional data type could be referred to as second or additional data items.

It is further preferred that a payload section of a data packet may comprise data items of different data types, wherein data items are transmitted as records, each record comprising a header identifying the data type of the data item and the length of the record. In other words, data items of different data types can be transmitted in the payload section of the same data packet. To this end, the data items of a data type are packed in records having a header identifying the data type and a payload comprising the data item or data items. This advantageously enables the method to completely fill the payload section of a data packet with data items of different data types if there should not be enough data items from a single data type that have to be transmitted first. Thus, the space available in data packet is used optimally.

In a preferred embodiment the method switches from the regular operation mode to the transmission operation mode when a trigger signal is received. The trigger signal may, for example, be generated by a method or a system for determining the risk of an aircraft accident if the risk exceeds a predetermined threshold.

It is further preferred if for at least one of the data types data items are stored in frames of a predetermined length in the buffers. For at least one data type for which data items are stored in frames of predetermined size, a plurality of frames can preferably be combined and compressed to a single compressed frame which is stored in the buffers. For example, if frames of flight data data items are received at a buffer, these frames are first collected in the buffer for a predetermined time span. Once a sufficiently high number of frames has been collected, these frames are combined and compressed into a single compressed frame. Thus, if the compressed frames are later transmitted, more relevant data can be transmitted in a shorter time frame, i.e., with less data packets.

In a second aspect the problem is solved by a transmitter for transmitting continuously created data items from an aircraft to a receiver. The data items have a plurality of data types and each data type has been assigned a different priority ranging from a highest priority to a lowest priority. The transmitter comprises last-in-first-out buffers for storage of the continuously created data items. For each data type a separate live buffer and a separate main buffer are provided and associated with the respective data type and data items of a specific data type are only storable in the associated buffers. The transmitter is operable in a regular operation mode and a transmission operation mode. In the regular operation mode the transmitter is adapted to continuously store continuously created data items of the plurality of data types in the associated main buffers. In the transmission operation mode the transmitter is adapted to
- continuously store continuously created data items of the plurality of data types in the associated live buffers,
- transmit consecutive data packets from the aircraft to a receiver via a data transmission link, each data packet comprising a header section and a payload section, and
- select for each data packet the data to be transmitted in the payload section from the buffers, wherein any data item stored in a live buffer is transmitted before any data item stored in a main buffer, wherein of those data items stored in one of the live buffers, any data item of a data type having a higher priority is transmitted before any data item of a data type having a lower priority, and wherein of those data items stored in one of the main buffers, any data item of a data type having a higher priority is transmitted before any data item of a data type having a lower priority.

In a preferred embodiment for each of the live buffers a maximum age of data items retained in the live buffer is defined. The transmitter is adapted to move a data item from a live buffer to a respective main buffer in the transmission operation mode when an age of the data item exceeds the maximum age defined for the live buffer, wherein any data item that has been stored in a live buffer before an other data item is moved to the main buffer before the other data item.

It is further preferred that the transmitter comprises for each data type a separate overflow buffer associated with the respective data type and that for each of the main buffers a maximum age for data items to be retained in the main buffer has been defined. The transmitter is adapted to move a data item from a main buffer to a respective overflow buffer when an age of the data item exceeds the maximum age defined for the main buffer, wherein any data item that has been stored in a main buffer before an other data item is moved to the overflow buffer before the other data item. In the transmission operation mode any data item stored in a main buffer is transmitted before any data item stored in an overflow buffer, wherein of those data items stored in one of the overflow buffers, any data item of a data type having a higher priority is transmitted before any data item of a data type having a lower priority.

In an exemplary preferred embodiment the transmitter is adapted for transmitting data items of an additional data type. The additional data type has a different priority than any of the other data types selected from a range of priorities ranging from a lowest to a highest priority. For the additional data type a separate overflow buffer is provided in the transmitter and associated with the additional data type. The transmitter is adapted to store data items of the additional data type in the associated overflow buffer in the transmission operation mode and in the regular operation mode. During transmission data items of the additional data type are treated like data items of any of the other data types, i.e., of those data items stored in one of the overflow buffers including the overflow buffer associated to the additional data type any data item of a data type having a higher priority is transmitted before any data item of a data type having a lower priority stored in an overflow buffer.

In a preferred embodiment a payload section of a data packet may comprise data items of different data types, wherein data items are transmitted as records, each record comprising a header identifying the data type of the data item and the length of the record.

In another preferred embodiment the transmitter is adapted to receive a trigger signal and to switch from the regular operation mode to the transmission operation mode when the trigger signal has been received.

It is further preferred that for at least one of the data types data items are stored in frames of a predetermined length in the buffers. For at least one data type for which data items are stored in frames of predetermined size a plurality of frames can preferably be combined and compressed to a single compressed frame which is stored in the buffers.

The advantages and exemplary description of the various methods according to the present invention apply vice versa to the embodiments of a transmitter according to the present invention having structural features that correspond to the features of the methods.

Finally, in a third aspect the problem is solved by an aircraft comprising a transmitter according to any of the preceding embodiments. The advantages of the different embodiments of the aircraft correspond to the advantages of the transmitter used therein.

BRIEF DESCRIPTION OF THE DRAWINGS

In the following, an exemplary embodiment of a method, a transmitter and an aircraft according to the present invention will be explained in more detail with reference to the schematic drawings, wherein.

DETAILED DESCRIPTION

Figure 1:
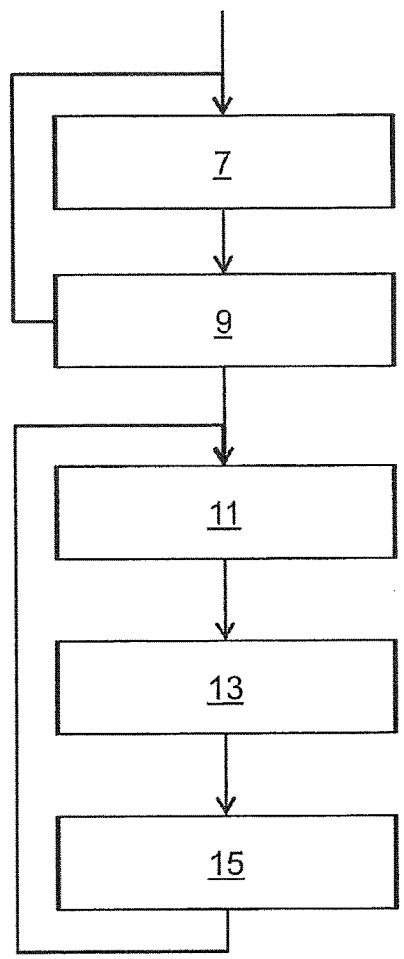
FIG. 1 shows a flow chart of an exemplary method according to the present invention.

FIG. 1 shows a flow chart schematically depicting an exemplary embodiment of a method according to the present invention. The method is provided for transmitting continuously created data items, such as data items stored in a flight recorder of an aircraft, to a ground station. The exemplary embodiment of a method shown in FIG. 1 is adapted for transmitting data items of the following data types: flight data, cockpit voice recordings and air traffic control messages. To these data types may also be referred to as first data types and to data items of these data types may also be referred to as first data items. Each of the data types has been assigned a different priority selected from a range of priorities extending from a highest priority to a lowest priority. Air traffic control messages have been assigned the highest priority, flight data has been assigned the second highest priority and cockpit voice recordings have been assigned the third highest priority.

The method is further adapted for transmitting data items of an additional or second data type in form of a cockpit images. The data items of the additional data type may also be referred to as second data items. Further, the additional data type has also been assigned a priority from a range of priorities extending from the highest to a lowest priority. The priority assigned to the additional data type is different from the priorities assigned to any of the other data types. In the present example, cockpit images have been assigned the lowest or fourth highest priority.

Figure 2:
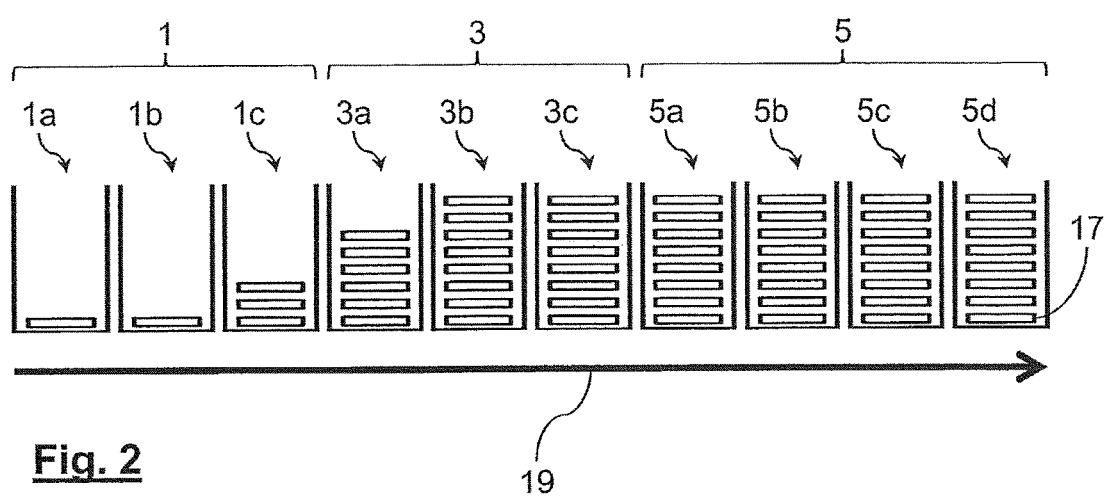
FIG. 2 shows an exemplary embodiment of an arrangement of live buffers, main buffers and overflow buffers.

The exemplary embodiment of a method provides last-in-first-out (LIFO) buffers for the continuously created data items. As can be seen in FIG. 2, three different kinds of LIFO buffers are provided: three live buffers 1a, 1b, 1c, three main buffers 3a, 3b, 3c and four overflow buffers 5a, 5b, 5c, 5d. To improve the ease of understanding, in the following where no reference is made to a specific live buffer 1a, 1b, 1c, the live buffers will generally be indicated by reference numeral 1; where no reference is made to a specific main buffer 3a, 3b, 3c, the main buffers will generally be indicated by reference numeral 3; and where no reference is made to a specific overflow buffer 5a, 5b, 5c, 5d, the overflow buffers will generally be indicated by reference numeral 5.

For each of the first data types a separate live buffer 1, a separate main buffer 3 and a separate overflow buffer 5 are provided and assigned to the respective data type. In detail, live buffer 1a, main buffer 3a and overflow buffer 5a are assigned to the air traffic control messages data type, live buffer 1b, main buffer 3b and overflow buffer 5b are assigned to the flight data data type and live buffer 1c, main buffer 3c and overflow buffer 5c are assigned to the cockpit voice recordings data type. For the second data type only an overflow buffer 5d is provided and assigned to this data type, i.e., the overflow buffer 5d is assigned to the cockpit images data type.

The method can operate in two different operation modes. A first or regular operation mode includes a first and a second method step 7, 9 and a second or transmission operation mode includes a third, a fourth and a fifth method step 11, 13, 15.

Figure 3:
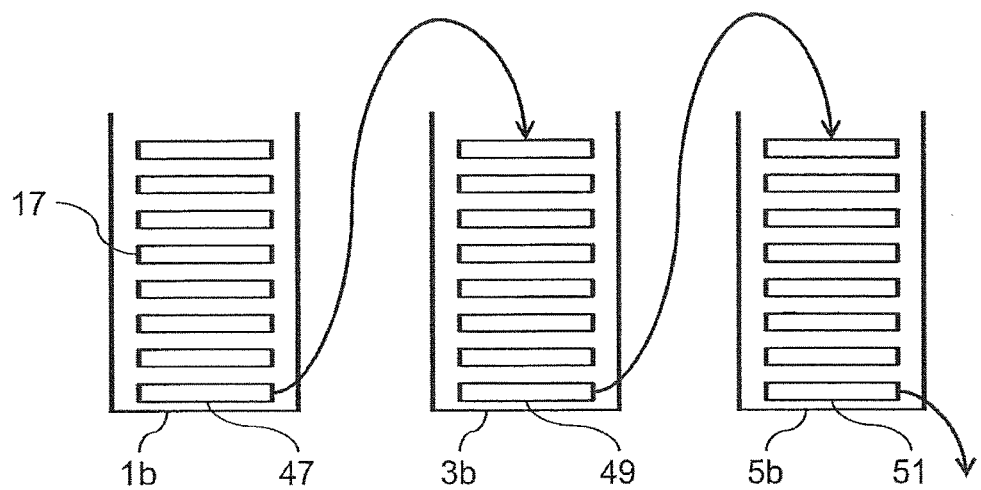
FIG. 3 shows an exemplary embodiment of a live buffer, a main buffer and an overflow buffer.
Figure 4:
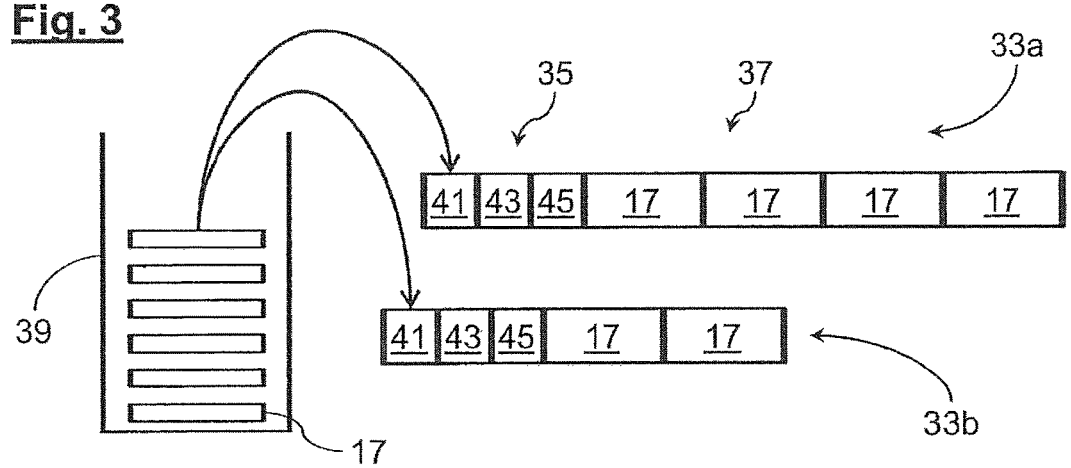
FIG. 4 shows an exemplary embodiment of a buffer and two data records according to the present invention.

In the regular operation modes any continuously created data item of a first data type is continuously stored in the main buffer 3 associated with the respective data type in the first method step 7. Any continuously created data item of the second data type is continuously stored in the overflow buffer 4d associated with the second data type. All data items regardless of their type are stored in frames 17 in the buffers 1, 3, 5. In FIGS. 2, 3 and 4 only a single frame 17 has been provided with a reference numeral to keep FIGS. 2, 3 and 4 easy to understand.

In the exemplary embodiment of the method shown in FIG. 1 data items are always stored in the form of frames 17 in the buffers 1, 3, 5. How the content of the frames 17 is generated depends on the data type. For example, a frame 17 of flight data may comprise uncompressed flight data data items created over a period of 125 ms. Another frame 17 of flight data may comprise compressed flight data which has, for example, been generated from eighty uncompressed flight data frames 17. Frames 17 comprising air traffic control message data items comprise uncompressed data and frames 17 comprising cockpit voice recordings or cockpit images only comprise compressed recordings or images, respectively.

The second method step 9 checks if a trigger signal has been received from an external source, for example, from a system determining a risk of an aircraft emergency. If the trigger signal has been received, the method switches to the transmission operation mode and continues with the third, fourth and fifth methods steps 11, 13, 15. If no trigger signal has been received, the method continues to operate in the regular operation mode. It should be noted, that FIG. 1 only shows a schematic representation of the flow of the exemplary embodiment of the method. The first and the second method step 7, 9 do not have to be executed in sequence. It is also possible, that the first and the second method step 7, 9 are parallel processes. The first method step 7 continuously stores continuously created data items in the respective buffers 3, 5 and the second method step 9 monitors in parallel whether a trigger signal is received. If a trigger signal is received, the second method step 9 stops the first method step 7 and the method continues with the third method step 11. The same applies to the third, fourth and fifth method steps 11, 13, 15, which are shown in FIG. 1 as sequential method steps. However, method steps 13 and 15 may be implemented as an independent process executed in parallel to method step 11.

In the third step 11 data items of a first data type are continuously stored in the associated live buffers 1, i.e., any air traffic control message data items that are created, are stored in the associated air traffic control message live buffer 1a, flight data data items are stored in the associated flight data live buffer 1b and cockpit voice recordings data items are stored in the associated cockpit voice recordings live buffer 1c. In the same method step 11, any data item of the second data type is still stored in the associated overflow buffer 5d.

In the fourth step 13, data items are selected from the buffers 1, 3, 5 for transmission in the form of data packets in the fifth step 15. Data items are selected from the buffers 1, 3, 5 according to the following rules: any data item stored in a live buffer 1 has to be transmitted before any data item stored in a main buffer 3 and any data item stored in a main buffer 3 has to be transmitted before any data item stored in an overflow buffer 5. Within each buffer category, i.e., live buffer 1, main buffer 3 or overflow buffer 5, every data item of a data type having a higher priority has to be transmitted before a data item having a lower priority. Applied to the exemplary embodiment this means that first any data item of the live buffer 1a associated with air traffic control messages is transmitted. Next, any data item stored in the live buffer 1b associated with flight data is transmitted, followed by any data item stored in the live buffer 1c associated with cockpit voice recordings. If all items from the live buffers 1 have been selected for transmission, the data items stored in the main buffers 3 are selected in the same order. Finally, if any data item stored in a main buffer 3 has been selected for transmission, data items stored in an overflow buffer are selected in the order of the priority of the data type. In FIG. 2 the order in which data items are selected from the buffers 1, 3, 5 is indicated by the arrow 19.

It should be noted that the buffers 1, 3, 5 are LIFO buffers. Thus, whenever a data item is selected from a buffer 1, 3, 5, the data item is removed that has been stored last in a temporal order in the buffer 1, 3, 5. In other words, the LIFO buffers 1, 3, 5 advantageously add a temporal prioritization to the selection of data items as the LIFO buffers 1, 3, 5 make sure that more recently created data items are always selected first.

Once the data items for transmission with the next data packet have been selected in the fourth step, the data items are stored in the payload of a data packet and transmitted via a data transmission link in the fifth method step 15. The data transmission link is a satellite communication network using the IP protocol for data transmission between aircraft and ground station.

It should be noted that every time data items are selected for transmission with the next data packet, the selection process starts again at the live buffer 1a having the highest priority and continuously works its way through the buffers 1, 3, 5 selecting data items for transmission according to their priority. Thus, it is ensured that whenever a new data packet can be transmitted, the most recent and most highly prioritized data items are transmitted before any data item having arrived earlier or having a lower priority.

Further, providing main buffers 3 advantageously ensures that at the time the method switches from the regular operation mode to the transmission operation mode, there is always some data created or recorded before the transmission operation mode was activated. In particular if the method is used to transmit data usually stored in a flight recorder, this data may be helpful for determining the cause of the accident as it was captured right before it was detected that there is a risk of an aircraft emergency and the data, therefore, could include an indication why the transmission operation mode was activated. It should, however, be pointed out that in the method according to the present invention any data item of a first data type created after the transmission operation mode was activated is stored in the liver buffers 1 and, therefore, transmitted before the historical data stored in the main buffers 3.

Figure 5:
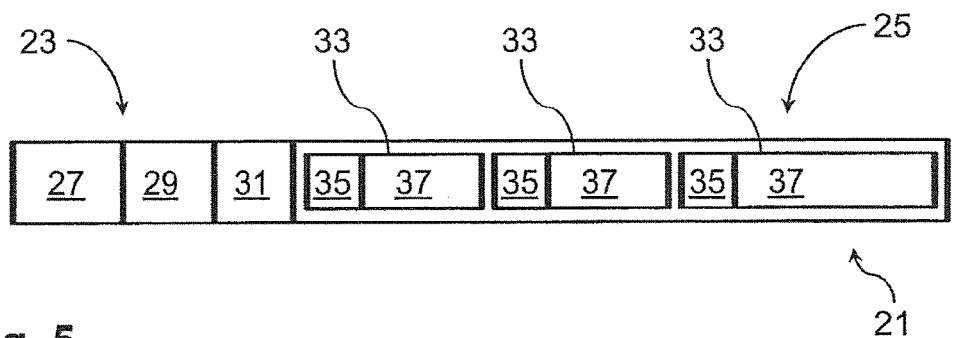
FIG. 5 shows an exemplary embodiment of a data packet.

Part of the transmission and selection method steps 13, 15 are shown in more detail in FIGS. 4 and 5. In FIG. 5, an exemplary embodiment of a data packet 21 is shown in more detail. The data packet 21 comprises a header section 23 and a payload section 25. The header section 23 comprises an IP header 27, a UDP header 29 and an aircraft identifier 31. The IP header 27 and the UDP header 29 are part of the transmission protocols used for transmitting the data packet 21 via the satellite network. The aircraft identifier 31 is an identifier that unambiguously identifies the aircraft sending the data packet 21. The payload section 25 comprises the data items that shall be transmitted packed in several records 33. Each record comprises a record header 35 and a record payload 37. The overall maximum allowable size of the data packet 21 is determined by the transmission link and the transmission protocol. Each of the elements 27, 29, 31 of the header section 23 has a predetermined length, i.e., comprises a predetermined number of bits. The remaining available bits are used for the payload section 25.

The structure of the records 33 and how the records are created from the data items stored in the buffers 1, 3, 5 will next be described in more detail with reference to FIG. 4. FIG. 4 shows an arbitrary buffer 39 comprising six frames 17 of data items. For the following description it will be assumed that this buffer 39 is the buffer 39 from which the next data items have to be selected according to the rules set out above. From the buffer 39 as many data items are selected as can be fitted in the payload section 25 of the next data packet 21. The payload section 25 may, for example, have enough space left to transmit the data stored in four frames 17. Thus, four frames 17 are selected and added to the record payload 37 of a first record 33a. Additionally, header information such as a data type identifier 41, a record payload length 43 and a time stamp 45 are added to the record header 35. Once the top four frames 17 have been selected from the buffer 39, only two frames 17 remain in the buffer 39. Assuming that no new frames 17 are added to the buffer 39 between the selection of data items for two consecutive data packets 21, the remaining two frames 17 are added to the record payload 37 of a second record 33b. The second record 33b comprises the same data type identifier 41 in the record header 35 as the first record 33b, but the record payload length 43 and the time stamp 45 are different.

As can be seen in FIG. 5, if a record 33 comprising data items of a single data type is not sufficient to fill the entire payload section 25 of the data packet 21, records 33 of different data types can be advantageously be added to the same payload section 25 to maximize the number of data items that is transmitted with every data packet 21 and optimize the use of the available bandwidth.

For each of the buffers a maximum age of data items to be retained in the buffer has been defined. For flight data data items and cockpit voice recording data items stored in the respective main buffers 3b, 3c the maximum age has been defined as five minutes and for data items of these data types stored in the live buffers 1b, 1c a maximum age has been defined as one minute. For air traffic control messages the maximum age has been defined as two hours for the associated main buffer 3a and 5 minutes for the associated live buffer 1a. Only data items having an age which is younger, i.e., smaller, than the maximum age are retained in the respective buffer.

FIG. 3 shows in an exemplary fashion how the live buffer 1b, the main buffer 3b and the overflow buffer 5b associated with the flight data data type are functionally connected. The buffers 1a, 1c, 3a, 3c, 5a, 5c associated with the air traffic control messages and the cockpit voice recordings, respectively, are linked in the same manner. The buffers 1b, 3b, 5b are all LIFO buffers having a limited capacity. As flight data data items are created continuously at a fixed rate, i.e., with a predetermined frequency, providing buffers of a fixed physical storage capacity corresponds to defining a maximum age for data items to be retained in the buffer. If one of the buffers has reached its maximum capacity, i.e., the maximum number of frames 17 that can be stored in the buffer 1b, 3b, 5b has been reached and a newly created frame 17 shall be stored in the buffer 1b, 3b, 5b, of those frames 17 stored in the respective buffer 1b, 3b, 5b the frame 47, 49, 51 that has been stored first in a temporal order in the buffer 1b, 3b, 5b is removed or pushed from the buffer 1b, 3b, 5b. For example, in the regular operation mode new data items are continuously added to the main buffer 3b. As soon as the buffer 3b has been completely filled with data items or frames 17, the oldest frame 49 is removed from the main buffer 3b to make space available for the newly added frame 17.

In the exemplary embodiment of the method, frames 47 removed from the live buffer 1b are, however, not immediately discarded but moved to the main buffer 3b. Likewise, any frame 49 removed from the main buffer 3b is moved to the overflow buffer 5b. Thus, the main buffer 3b serves as additional storage space for data items from the live buffer 1b and the overflow buffer 5b provides additional storage space for data items from the main buffer 3b. This could be particularly advantageous if the bandwidth or data rate available for transmission over the transmission link is variable. The bandwidth may, for example, for some time be too low after the transmission operation mode has been activated to transmit all data items stored in the live buffer 1. At least the live buffers 1c associated with a data type having the lowest priority of the first data types will continuously fill up until it overflows and older data items are pushed to the respective main buffer 3c. If after some time the bandwidth increases, the data items stored in the main buffer 3c are still available and could be transmitted provided that the data rate is high enough. Likewise, if the main buffers 3 are completely filled, the overflow buffers 5 provide additional storage space such that when a high data rate should be available, further historic data items can be transmitted. However, by providing main buffers 3 of limited size, it is advantageously ensured that first the most relevant data items of all different data types are transmitted.

For data items that are continuously created at irregular intervals such as air traffic control messages the data items are stored with a time stamp and removed from the respective buffer 1a, 3a, 5a when an age of the data item exceeds the maximum age defined for the respective buffer. For example, the maximum age for the live buffer 1a could be set to five minutes, for the main buffer 3a to two hours and for the overflow buffer 5a to five hours. In other words, the method continuously compares the age of data items stored in the buffers 1a, 3a, 5a with maximum age and removes any data item having a maximum age exceeding the respective maximum age from the buffer. Any data item removed from the live buffer 1a is moved to the main buffer 3a and any data item removed from the main buffer 3a is moved to the overflow buffer 5a. Data items removed from the overflow buffer are discarded.

Figure 6:
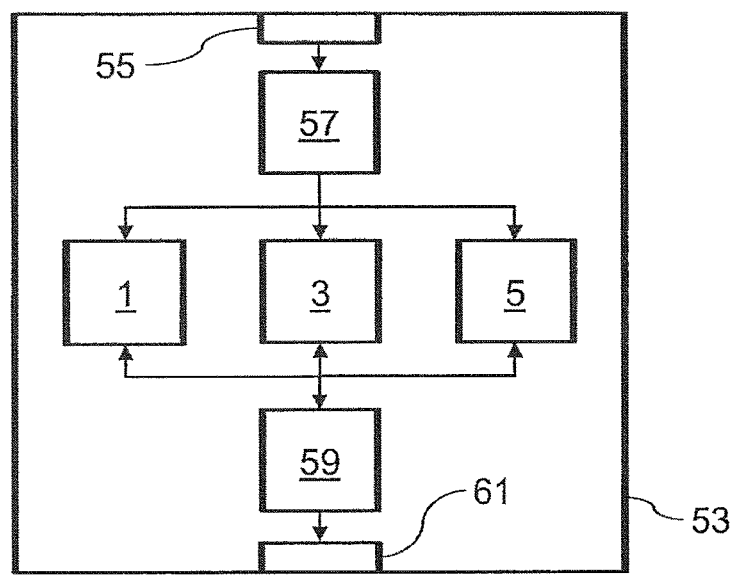
FIG. 6 shows an exemplary embodiment of a transmitter according to the present invention and FIG. 7 shows an exemplary embodiment of an aircraft according to the present invention comprising an exemplary embodiment of a transmitter according to the present invention.

FIG. 6 shows an exemplary embodiment of a transmitter 53. The transmitter 53 is adapted to carry out the exemplary embodiment of a method according to the present invention as described with reference to FIGS. 1 to 5. The transmitter 53 comprises an input 55 which receives the continuously created data items, for example, from an aircraft's main control system. The input 55 further may receive a trigger signal for switching the transmitter 53 from a regular operation mode to a transmission operation mode and back. Incoming data items are relayed to a distributor 57 which is adapted to distribute the data items depending on the operation mode and the data type of the data items to one of the buffers 1, 3, 5 of the transmitter 53. In FIG. 6 the buffers 1, 3, 5 are only generally indicated and not shown in detail. In particular, the transmitter 53 comprises a live buffer 1a, 1b, 1c and a main buffer 3a, 3b, 3c for each first data type and an overflow buffer 5a, 5b, 5c, 5d for each first and second data type as required for carrying out the exemplary embodiment of the method which are not shown individually in FIG. 6.

The transmitter 53 further comprises a packetizer 59 which selects data items or frames 17 from the buffers 1, 3, 5 according to the rules set out above, adds the data items to the record payload 37 of records 33 and also adds the necessary header information to the record header 35. Finally, the packetizer also packs the records 33 into the payload section 23 of the data packet 21 that is being prepared and adds the necessary header information to the header section 23. Finally, an output 61 transmits the data packets 21 via a data transmission link to a ground station.

With regard to the details of the transmitter 53 reference is made to the preceding description of the exemplary embodiment of the method according to the present invention. As the transmitter 53 is adapted to carry out the method as described above, this adds several limitations to the transmitter 53 that have to be taken into consideration. As the transmitter 53 is adapted to carry out the method according to the present invention, the transmitter 53 shares the advantages of the exemplary embodiment of the method.

Figure 7:
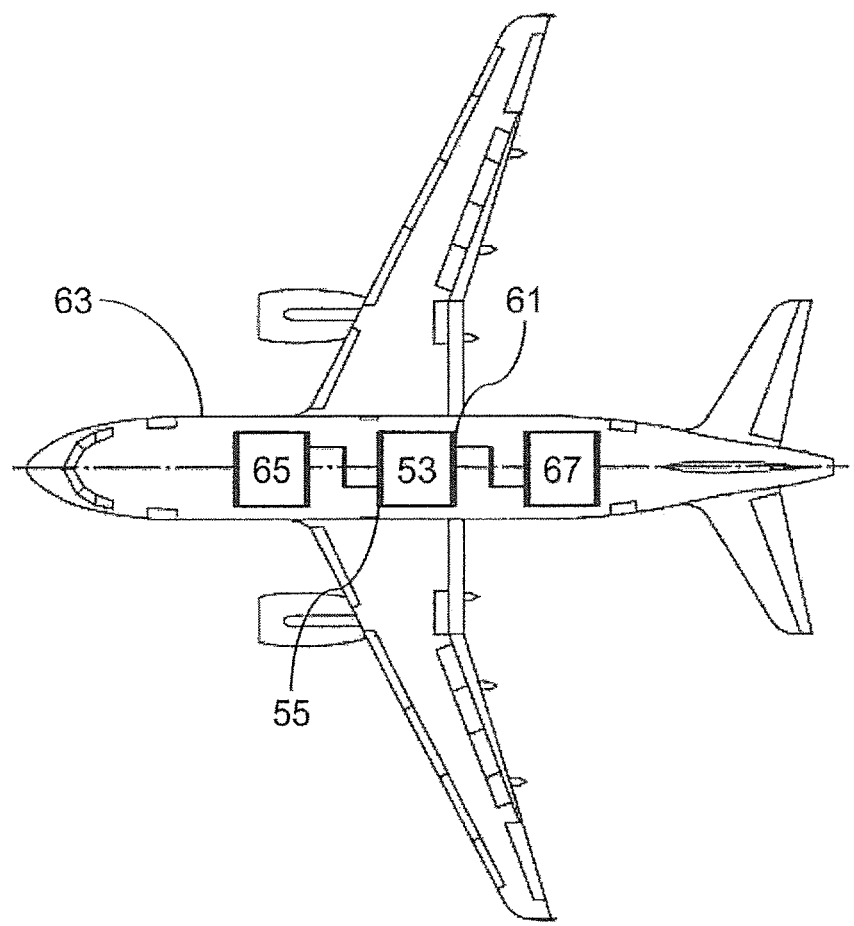

Finally, FIG. 7 shows an exemplary embodiment of an aircraft 63 according to the present invention. The aircraft 63 comprises a transmitter 53 as shown in FIG. 6. Thus, the above description of the transmitter 53 fully applies to the aircraft 63. The transmitter's input 55 is connected to a main control system 65 of the aircraft 63 and the output 61 of the transmitter 53 is connected to a satellite antenna 67 for providing a data transmission link.

The aircraft 63 according to the present invention shares the advantages of the exemplary embodiment of a transmitter 53 and the exemplary embodiment of the method according to the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for transmitting continuously created data items from an aircraft to a receiver, wherein the data items are of a plurality of data types, wherein each of the plurality of data types is assigned a different priority ranging from a highest priority to a lowest priority, the method comprising:
   providing last-in-first-out buffers for storage of the continuously created data items, wherein for each data type a separate live buffer and a separate main buffer are provided and associated with the respective data type and data items of a specific data type are only stored in the associated buffers;
   in a regular operation mode, continuously storing continuously created data items of the plurality of data types in the associated main buffers;
   in a transmission operation mode,
      continuously storing continuously created data items of the plurality of data types in the associated live buffers,
      transmitting consecutive data packets from the aircraft to a receiver via a data transmission link, each data packet comprising a header section and a payload section, and
      selecting from the buffers, for each data packet, the data to be transmitted in the payload section, wherein any data item stored in a live buffer is transmitted before any data item stored in a main buffer, wherein of the data items stored in one of the live buffers, any data item of a data type having a higher priority is transmitted before any data item of a data type having a lower priority, and wherein of the data items stored in one of the main buffers, any data item of a data type having a higher priority is transmitted before any data item of a data type having a lower priority; and defining, for each of the live buffers, a maximum age for data items to be retained in the live buffer; and in the transmission operation mode, moving a data item from a live buffer to a respective main buffer when an age of the data item exceeds the maximum age defined for the live buffer, wherein any data item that has been stored in a live buffer before an other data item is moved to the main buffer before the other data item.

2. The method according to claim 1, wherein a payload section of a data packet may comprise data items of different data types, wherein data items are transmitted as records, each record comprising a header identifying the data type of the data item and the length of the record.

3. The method according to claim 1, further comprising switching from the regular operation mode to the transmission operation mode when a trigger signal is received.

4. The method according to claim 1, wherein for at least one of the data types data items are stored in frames of a predetermined length in the buffers.

5. The method according to claim 4, wherein for at least one data type for which data items are stored in frames of predetermined size, a plurality of frames is combined and compressed to a single compressed frame which is stored in the buffers.

6. A method for transmitting continuously created data items from an aircraft to a receiver, wherein the data items are of a plurality of data types, wherein each of the plurality of data types is assigned a different priority ranging from a highest priority to a lowest priority, the method comprising:

providing last-in-first-out buffers for storage of the continuously created data items, wherein for each data type a separate live buffer and a separate main buffer are provided and associated with the respective data type and data items of a specific data type are only stored in the associated buffers;

in a regular operation mode, continuously storing continuously created data items of the plurality of data types in the associated main buffers;

in a transmission operation mode,
continuously storing continuously created data items of the plurality of data types in the associated live buffers, transmitting consecutive data packets from the aircraft to a receiver via a data transmission link, each data packet comprising a header section and a payload section, and selecting from the buffers, for each data packet, the data to be transmitted in the payload section, wherein any data item stored in a live buffer is transmitted before any data item stored in a main buffer, wherein of the data items stored in one of the live buffers, any data item of a data type having a higher priority is transmitted before any data item of a data type having a lower priority, and wherein of the data items stored in one of the main buffers, any data item of a data type having a higher priority is transmitted before any data item of a data type having a lower priority;

providing, for each data type, a separate overflow buffer and associating the separate overflow buffer with the respective data type and defining, for each of the main buffers, a maximum age for data items to be retained in the main buffer;

moving a data item from a main buffer to a respective overflow buffer when an age of the data item exceeds the maximum age defined for the main buffer, wherein any data item that has been stored in a main buffer before an other data item is moved to the overflow buffer before the other data item; and in the transmission operation mode, transmitting any data item stored in a main buffer before any data item stored in an overflow buffer, wherein of the data items stored in one of the overflow buffers any data item of a data type having a higher priority is transmitted before any data item of a data type having a lower priority.

7. A transmitter for transmitting continuously created data items from an aircraft to a receiver, wherein the data items have a plurality of data types and each data type has a different priority ranging from a highest priority to a lowest priority, wherein the transmitter comprises last-in-first-out buffers for storage of the continuously created data items, wherein for each data type a separate live buffer and a separate main buffer are provided and associated with the respective data type and data items of a specific data type are only storable in the associated buffers, wherein the transmitter is operable in a regular operation mode and a transmission operation mode, wherein in the regular operation mode the transmitter is adapted to continuously store continuously created data items of the plurality of data types in the associated main buffers, wherein in the transmission operation mode the transmitter is adapted to
continuously store continuously created data items of the plurality of data types in the associated live buffers, transmit consecutive data packets from the aircraft to a receiver via a data transmission link, each data packet comprising a header section and a payload section, and select for each data packet the data to be transmitted in the payload section from the buffers, wherein any data item stored in a live buffer is transmitted before any data item stored in a main buffer, wherein of those data items stored in one of the live buffers, any data item of a data type having a higher priority is transmitted before any data item of a data type having a lower priority, and wherein of those data items stored in one of the main buffers, any data item of a data type having a higher priority is transmitted before any data item of a data type having a lower priority, and wherein for each of the live buffers a maximum age for data items to be retained in the live buffer is defined, and wherein the transmitter is adapted to move a data item from a live buffer to a respective main buffer in the transmission operation mode when an age of the data item exceeds the maximum age defined for the live buffer, wherein any data item that has been stored in a live buffer before an other data item is moved to the main buffer before the other data item.

8. The transmitter according to claim 7, wherein a payload section of a data packet may comprise data items of different data types, wherein data items are transmitted as records, each record comprising a header identifying the data type of the data item and the length of the record.

9. The transmitter according to claim 7, wherein the transmitter is adapted to receive a trigger signal and to switch from the regular operation mode to the transmission operation mode when the trigger signal has been received.

10. The transmitter according to claim 7, wherein for at least one of the data types data items are stored in frames of a predetermined length in the buffers.

11. The transmitter according to claim 7, wherein for at least one data type for which data items are stored in frames of predetermined size a plurality of frames can be combined and compressed to a single compressed frame which is stored in the buffers.

12. A transmitter for transmitting continuously created data items from an aircraft to a receiver, wherein the data items have a plurality of data types and each data type has a different priority ranging from a highest priority to a lowest priority,
wherein the transmitter comprises last-in-first-out buffers for storage of the continuously created data items, wherein for each data type a separate live buffer and a separate main buffer are provided and associated with the respective data type and data items of a specific data type are only storable in the associated buffers,
wherein the transmitter is operable in a regular operation mode and a transmission operation mode,
wherein in the regular operation mode the transmitter is adapted to continuously store continuously created data items of the plurality of data types in the associated main buffers,
wherein in the transmission operation mode the transmitter is adapted to
continuously store continuously created data items of the plurality of data types in the associated live buffers,
transmit consecutive data packets from the aircraft to a receiver via a data transmission link, each data packet comprising a header section and a payload section, and
select for each data packet the data to be transmitted in the payload section from the buffers, wherein any data item stored in a live buffer is transmitted before any data item stored in a main buffer, wherein of those data items stored in one of the live buffers, any data item of a data type having a higher priority is transmitted before any data item of a data type having a lower priority, and wherein of those data items stored in one of the main buffers, any data item of a data type having a higher priority is transmitted before any data item of a data type having a lower priority,
wherein the transmitter comprises for each data type a separate overflow buffer associated with the respective data type and wherein for each of the main buffers a maximum age for data items to be retained in the main buffer has been defined,
wherein the transmitter is adapted to move a data item from a main buffer to a respective overflow buffer when an age of the data item exceeds the maximum age defined for the main buffer, wherein any data item that has been stored in a main buffer before an other data item is moved to the overflow buffer before the other data item, and
wherein in the transmission operation mode any data item stored in a main buffer is transmitted before any data item stored in an overflow buffer, wherein of those data items stored in one of the overflow buffers, any data item of a data type having a higher priority is transmitted before any data item of a data type having a lower priority.

13. The transmitter according to claim 12, wherein a payload section of a data packet may comprise data items of different data types, wherein data items are transmitted as records, each record comprising a header identifying the data type of the data item and the length of the record.

14. The transmitter according to claim 12, wherein the transmitter is adapted to receive a trigger signal and to switch from the regular operation mode to the transmission operation mode when the trigger signal has been received.

15. The transmitter according to claim 12, wherein for at least one of the data types data items are stored in frames of a predetermined length in the buffers.

16. The transmitter according to claim 12, wherein for at least one data type for which data items are stored in frames of predetermined size a plurality of frames can be combined and compressed to a single compressed frame which is stored in the buffers.

17. An aircraft comprising a transmitter for transmitting continuously created data items from an aircraft to a receiver, wherein the data items have a plurality of data types and each data type has a different priority ranging from a highest priority to a lowest priority,
wherein the transmitter comprises last-in-first-out buffers for storage of the continuously created data items, wherein for each data type a separate live buffer and a separate main buffer are provided and associated with the respective data type and data items of a specific data type are only storable in the associated buffers,
wherein the transmitter is operable in a regular operation mode and a transmission operation mode,
wherein in the regular operation mode the transmitter is adapted to continuously store continuously created data items of the plurality of data types in the associated main buffers,
wherein in the transmission operation mode the transmitter is adapted to
continuously store continuously created data items of the plurality of data types in the associated live buffers,
transmit consecutive data packets from the aircraft to a receiver via a data transmission link, each data packet comprising a header section and a payload section, and
select for each data packet the data to be transmitted in the payload section from the buffers, wherein any data item stored in a live buffer is transmitted before any data item stored in a main buffer, wherein of those data items stored in one of the live buffers, any data item of a data type having a higher priority is transmitted before any data item of a data type having a lower priority, and wherein of those data items stored in one of the main buffers, any data item of a data type having a higher priority is transmitted before any data item of a data type having a lower priority and
defining, for each of the live buffers, a maximum age for data items to be retained in the live buffer; and in the transmission operation mode, moving a data item from a live buffer to a respective main buffer when an age of the data item exceeds the maximum age defined for the live buffer, wherein any data item that has been stored in a live buffer before an other data item is moved to the main buffer before the other data item.

* * * * *